United States Patent
Frankel et al.

(10) Patent No.: US 12,470,293 B2
(45) Date of Patent: *Nov. 11, 2025

(54) EXPRESS MESH INTERSATELLITE OPTICAL COHERENT NETWORKING

(71) Applicant: Ciena Corporation, Hanover, MD (US)

(72) Inventors: Michael Y. Frankel, Bethesda, MD (US); Vladimir Pelekhaty, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 270 days.

This patent is subject to a terminal disclaimer.

(21) Appl. No.: 18/331,716

(22) Filed: Jun. 8, 2023

(65) Prior Publication Data

US 2024/0080099 A1    Mar. 7, 2024

Related U.S. Application Data

(63) Continuation of application No. 17/401,416, filed on Aug. 13, 2021, now Pat. No. 11,799,549.

(51) Int. Cl.
*H04B 10/118*     (2013.01)
*H04B 10/27*      (2013.01)

(52) U.S. Cl.
CPC .......... *H04B 10/118* (2013.01); *H04B 10/27* (2013.01)

(58) Field of Classification Search
CPC .............................. H04B 10/118; H04B 10/27
USPC .......................................................... 398/124
See application file for complete search history.

(56) References Cited

U.S. PATENT DOCUMENTS

| | | | |
|---|---|---|---|
| 6,072,774 A * | 6/2000 | Natarajan | H04B 7/1856 455/12.1 |
| 6,243,175 B1 | 6/2001 | Pelekhaty | |
| 6,553,226 B1 * | 4/2003 | Watson | H04B 7/18521 455/13.1 |
| 6,795,607 B1 | 9/2004 | Archambault et al. | |
| 7,184,215 B2 | 2/2007 | Pelekhaty | |
| 7,415,208 B1 | 8/2008 | Haggans et al. | |
| 7,853,156 B2 | 12/2010 | Grigoryan et al. | |
| 7,853,157 B2 | 12/2010 | Grigoryan et al. | |
| 8,005,375 B2 | 8/2011 | Frankel | |
| 8,625,994 B2 | 1/2014 | Archambault et al. | |
| 8,699,880 B2 | 4/2014 | Grigoryan et al. | |
| 8,977,125 B2 | 3/2015 | Grigoryan et al. | |

(Continued)

OTHER PUBLICATIONS

Qi Xiaogang et al., "A survey of routing techniques for satellite networks," Journal of Communications and Information Networks, vol. 1, No. 4, DOI: 10.11959/j.issn.2096-1081, 2016.058, Review Paper, Dec. 2016, pp. 67-85.

*Primary Examiner* — Dalzid E Singh
(74) *Attorney, Agent, or Firm* — Baratta Law PLLC; Lawrence A. Baratta, Jr.

(57) ABSTRACT

A method of configuring an express mesh satellite network includes monitoring a plurality of satellites in a constellation, wherein each of the plurality of satellites includes a plurality of coherent optical modems; determining a topology of the constellation based on (1) ground traffic sources and sinks and (2) locations of any of the plurality of satellites; and causing the any of the plurality of satellites and their corresponding plurality of coherent optical modems to perform one or more of a relay function and a ground link, with corresponding coherent optical modems of the plurality of coherent optical, and based on the topology.

20 Claims, 12 Drawing Sheets

S1
DETERMINING A TOPOLOGY FOR A PLURALITY OF SATELLITES BASED ON TRAFFIC SOURCES AND SINKS ON THE GROUND WHERE THE TOPOLOGY INCLUDES EXPRESS LINKS WHERE SATELLITES ARE DIRECTLY CONNECTED IN SPACE BY COHERENT OPTICAL MODEMS BASED ON THE TRAFFIC SOURCES AND SINKS

S2
CONFIGURING THE PLURALITY OF SATELLITES WITH THE TOPOLOGY

(56) References Cited

U.S. PATENT DOCUMENTS

| | | |
|---|---|---|
| 9,191,117 B2 | 11/2015 | Alexander et al. |
| 9,270,405 B2 | 2/2016 | Blair et al. |
| 9,374,166 B2 | 6/2016 | Mateosky et al. |
| 9,509,410 B2 | 11/2016 | Mateosky et al. |
| 9,515,767 B2 | 12/2016 | Frankel et al. |
| 9,551,836 B2 | 1/2017 | Frankel et al. |
| 10,141,926 B2 | 11/2018 | Frankel et al. |
| 10,142,092 B2 | 11/2018 | Pelekhaty et al. |
| 10,171,169 B2 | 1/2019 | Frankel et al. |
| 10,194,221 B2 | 1/2019 | Frankel et al. |
| 10,200,305 B2 | 2/2019 | Frankel et al. |
| 10,212,496 B2 | 2/2019 | Frankel et al. |
| 10,313,014 B2 | 6/2019 | Frankel et al. |
| 10,313,021 B1 | 6/2019 | Frankel et al. |
| 10,404,365 B2 | 9/2019 | Frankel et al. |
| 10,476,815 B2 | 11/2019 | Frankel et al. |
| 10,715,888 B2 | 7/2020 | Swinkels et al. |
| 10,749,602 B2 | 8/2020 | Charlton et al. |
| 11,026,001 B1 | 6/2021 | Frankel et al. |
| 11,063,667 B1 | 7/2021 | Ritter |
| 11,128,373 B1 | 9/2021 | Podmore et al. |
| 11,546,062 B1 * | 1/2023 | Moro ................... H04B 10/505 |
| 11,799,549 B2 * | 10/2023 | Frankel ................. H04B 10/27 |
| 2005/0100271 A1 | 5/2005 | Frankel |
| 2009/0154391 A1 * | 6/2009 | Wittenschlaeger ... H04W 36/18 370/316 |
| 2012/0281740 A1 | 11/2012 | Fujita et al. |
| 2014/0376914 A1 * | 12/2014 | Miniscalco ........ H04B 10/1129 398/58 |
| 2016/0037434 A1 * | 2/2016 | Gopal ................. H04B 7/1851 370/316 |
| 2016/0269116 A1 * | 9/2016 | Welle ..................... H04B 10/29 |
| 2018/0269972 A1 | 9/2018 | Djordjevic et al. |
| 2019/0028197 A1 | 1/2019 | Turner et al. |
| 2019/0082481 A1 | 3/2019 | Ravishankar et al. |
| 2019/0182180 A1 | 6/2019 | Frankel et al. |
| 2020/0236064 A1 | 7/2020 | Frankel et al. |
| 2021/0058685 A1 | 2/2021 | Frankel et al. |
| 2021/0075746 A1 | 3/2021 | Frankel et al. |
| 2022/0209868 A1 | 6/2022 | Frankel et al. |
| 2022/0225201 A1 * | 7/2022 | Rezaee ................. H04W 36/30 |

* cited by examiner

EXPRESS MESH INTERSATELLITE OPTICAL COHERENT NETWORKING

CROSS-REFERENCE TO RELATED APPLICATION(S)

The present disclosure is a continuation of U.S. patent application Ser. No. 17/401,416, filed Aug. 13, 2021, the contents of which are incorporated by reference in their entirety.

FIELD OF THE DISCLOSURE

The present disclosure generally relates to satellite networking. More particularly, the present disclosure relates to systems and methods for express mesh intersatellite optical coherent networking.

BACKGROUND OF THE DISCLOSURE

Proliferation of Multi-Satellite Systems (MSS) in both GEO (Geostationary Earth Orbit), MEO (Middle Earth Orbit) and LEO (Low Earth Orbit) has expanded personal voice and data communications and Internet in space. A satellite constellation is a group of artificial satellites working together as a system. Unlike a single satellite, a constellation can provide permanent global or near-global coverage, such that at any time everywhere on Earth at least one satellite is visible. Satellites are typically placed in sets of complementary orbital planes and connect to globally distributed ground stations. They may also use Inter-Satellite Communications (ISC). LEO MSS fly in formations including equally distanced satellites daisy-chained within separate orbital planes. Inter-Satellite Communications (ISC) are established by means of Inter-Satellite Links (ISL), which are distinguished as intra-plane (i.e., within a single orbit) and inter-plane (i.e., cross-orbit).

The ISLs are generally based on existing legacy routing by closest proximity between the satellites in LEO MSS. State of the art routing between satellites in a constellation is described in QI X G, MA J L, WU D, et al. A survey of routing techniques for satellite networks[J]. Journal of communications and information networks, 2016, 1(4): 66-85, the contents of which are incorporated by reference. This topological solution implies the standard routing procedures through the mesh-grid or 2D Torus networks. Drawbacks of the legacy ISC routing by proximity based on mesh-grid topology are excessive number of hop and zigzag shaped physical paths between the source and destination, resulting in increased latency. Many more satellites and their corresponding modems are involved in relaying the traffic in the process, resulting in increased power consumption, both through modem count and by requiring modems to run in higher-power, higher-capacity modes.

Within the legacy mesh-grid topology based on closest proximity of satellites the information is routed through the mesh-grid network of satellites in not quite straight zigzag path and involves number of hops between the satellites (8 hops between Starlink satellites over two most populous hubs in continental US, to be specific), utilizing as a result significant number of modems in a process, all of it resulting in increased latency and power consumption. It should also be noted that when packets traverse a modem, they consume network capacity, i.e., effective network load is a product of injected bit rate times number of hops a bit takes.

BRIEF SUMMARY OF THE DISCLOSURE

The present disclosure relates to systems and methods for express mesh intersatellite optical coherent networking. Specifically, the present disclosure includes a mesh topology of ISC links to connect the sources and destinations with the most data traffic demands directly and in straight line of sight, reducing the latency by cutting down number of hops and streamlining the physical path. The ISC links are formed with coherent optical modems in the satellites. Reduced number of actively involved satellites and their corresponding modems as well as reduced bandwidth load on most satellites reduces total network the power consumption.

In an embodiment, a satellite includes a plurality of coherent optical modems; and circuitry configured to switch traffic between the plurality of optical modems, wherein the satellite is configured to operate with a plurality of satellites in a constellation, and wherein the plurality of coherent optical modems are configured to operate in a topology for the constellation that is based on traffic sources and sinks on the ground where the topology includes express links where any of the plurality of coherent optical modems are directly connected in space based on the traffic sources and sinks. The topology can include no more than three hops to reach any satellite over a geographic area.

The satellite can be configured to rotate around the Earth and to become a node in the topology when in an associated affinity area having a ground link or requiring a relay function. The plurality of satellites can be in Low Earth Orbit (LEO) or Middle Earth Orbit (MEO). The satellite can be configured to power down or reduce power in some or all of the plurality of coherent optical modems outside of the associated affinity area. The topology can be fixed while the plurality of satellites orbit and take roles in the topology based on their location. A coherent optical modem can be configured with a modulation format to accommodate required direct connection distance to another satellite with required bandwidth. Transmitted optical power of a coherent optical modem can be configured to accommodate required direct connection distance to another satellite with required bandwidth.

In another embodiment, an express mesh satellite network includes a plurality of satellites arranged in a constellation, each including a plurality of coherent optical modems, wherein the plurality of satellites are configured in a topology based on traffic sources and sinks on the ground where the topology includes express links where satellites are directly connected in space by the plurality of coherent optical modems based on the traffic sources and sinks. The topology can include no more than three hops to reach any satellite over a geographic area.

The plurality of satellites are configured to become a node in the topology when in an associated affinity area having a ground link or requiring a relay function. The plurality of satellites can be in Low Earth Orbit (LEO) or Middle Earth Orbit (MEO). The plurality of satellites can be configured to power down or reduce power in some or all of the corresponding coherent optical modems outside of the associated affinity area. The topology can be fixed while the plurality of satellites orbit and take roles in the topology based on their location.

In a further embodiment, a method of configuring an express mesh satellite network includes determining a topology for a plurality of satellites based on traffic sources and sinks on the ground where the topology includes express links where satellites are directly connected in space by coherent optical modems based on the traffic sources and sinks; and configuring the plurality of satellites with the topology. The topology can include no more than three hops to reach any satellite over a geographic area. The plurality of satellites can be configured to become a node in the topology when in an associated affinity area having a ground link or requiring a relay function. The plurality of satellites can be in Low Earth Orbit (LEO).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
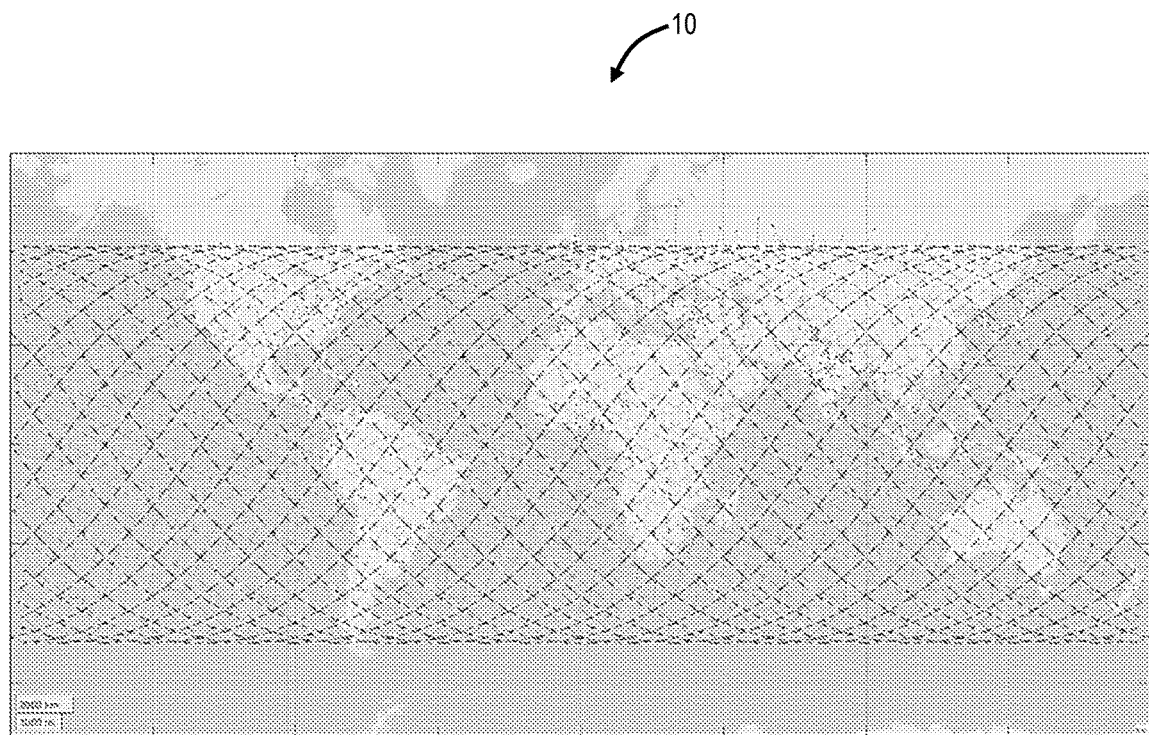
FIG. 1 is a map of the Earth illustrating an example LEO network (the Starlink satellite network).

Again, the present disclosure relates to systems and methods for express mesh intersatellite optical coherent networking. Specifically, the present disclosure includes a mesh topology of ISC links to connect the sources and destinations with the most data traffic demands directly and in straight line of sight, reducing the latency by cutting down number of hops and streamlining the physical path. The ISC links are formed with coherent optical modems in the satellites. Reduced number of actively involved satellites and their corresponding modems as well as reduced bandwidth load on most satellites reduces the total network power consumption.

The present disclosure includes a pseudo-static map of data source/sinks that require satellite interconnection, e.g., based on populations, data facilities, etc. The orbit altitude defines line of sight distance constraints. ISL link software-defined coherent optical modems determine dependence of available link bandwidth versus optical distance. The topological connections are established using compound graph algorithms that partition the network into sub-clusters, optimize sub-cluster connectivity for lowest diameter network with high throughput and low latency, optimize inter-cluster connectivity for lowest diameter composite network with high throughput and low latency, and connections are enforced to respect constraints on line of sight, reach, link capacity, angular pointing of ISL telescopes, etc.

Specific satellites are associated with a particular topological location when they enter a defined 'affinity area' in close proximity to the location (for LEO, MEO MSSs). Relay satellites are invoked when line of sight, reach, link capacity, etc. exceed direct-connect capability. Multiple satellites can be allocated to affinity areas if ground links are available and to relay functions if additional path redundancy or capacity is required. Additional satellites can be added to the constellation to provide coverage for low population density areas, typically with much lower ISL link capacities and power consumption. Examples are described herein assuming LEO constellations for illustration purposes, but satellites in MEG and even GEO orbits could be included.

Coherent Modem Functionality

Coherent optical modems utilize Digital Signal Processing (DSP) to support programmable modulation, or modulation formats with both varying phase and/or amplitude to enable 100 Gb/s, 200 Gb/s, 400 Gb/s, 600 Gb/s, 800 Gb/s and beyond to meet the ever-growing network demand. The modems can support multiple coherent modulation formats such as, for example, i) Dual-Polarization (DP) Binary Phase-Shift Keying (BPSK), ii) DP Quadrature Phase-Shift Keying (QPSK), iii) DP 16-Quadrature Amplitude Modulation (QAM), iv) DP 16 QAM, iv) DP 64 QAM, and the like. With associated DSP blocks in the modem hardware, moving from modulation formats can be software-programmable. Also, the modems can support dual-polarization, such as Polarization Multiplexing (X/Y or Horizontal/Vertical). Modems can support different transmit and receive carrier wavelengths to improve isolation. Modems can also adapt the FEC coding that is used, as another method to trade-off service rate vs. noise tolerance.

Observations

The present disclosure was based on the following observations related to coherent optical modems:

Space links scale very differently from fiber links. For fiber, two concatenated 30 dB fibers add to 60 dB. For space, two concatenated 30 dB links add to 36 dB (i.e., free-space loss scales as $R^2$). Thus, space links can extend much farther than fiber links.

Space links are Amplified Spontaneous Emission (ASE)-limited by the pre-amplifier, and coherent receivers have much better sensitivity especially for higher cardinality constellations, compared to direct-detect receivers. It is also more power-efficient to optically amplify the weak incoming signal than provide a very high-power Local Oscillator (LO).

Coherent DSP allows dynamic adaptation to match capacity to link reach at the lowest power consumption.

This disclosure focuses on topological drawbacks of LEO MSS, improving latency and power requirements by implementing an innovative Express-Mesh topology. Leveraging Coherent Modem programmability, it is possible to set up a much more efficient satellite network: higher throughput, lower power, lower latency, etc.

For purpose of the topology, it is assumed traffic sources and sinks are generally known. The sources and sinks could be geographically static, i.e., associated with population density or locations of data centers or locations of other large traffic generation facilities, and could depends on a particular customer mix.

Geostationary satellite links could be assumed 'geographically static.'

Dynamic sources of data could be included but are not likely to generate a sufficient quantity of data to perturb assumed topological constraints.

Conventional LEO MSS ISC Links

Figure 2:
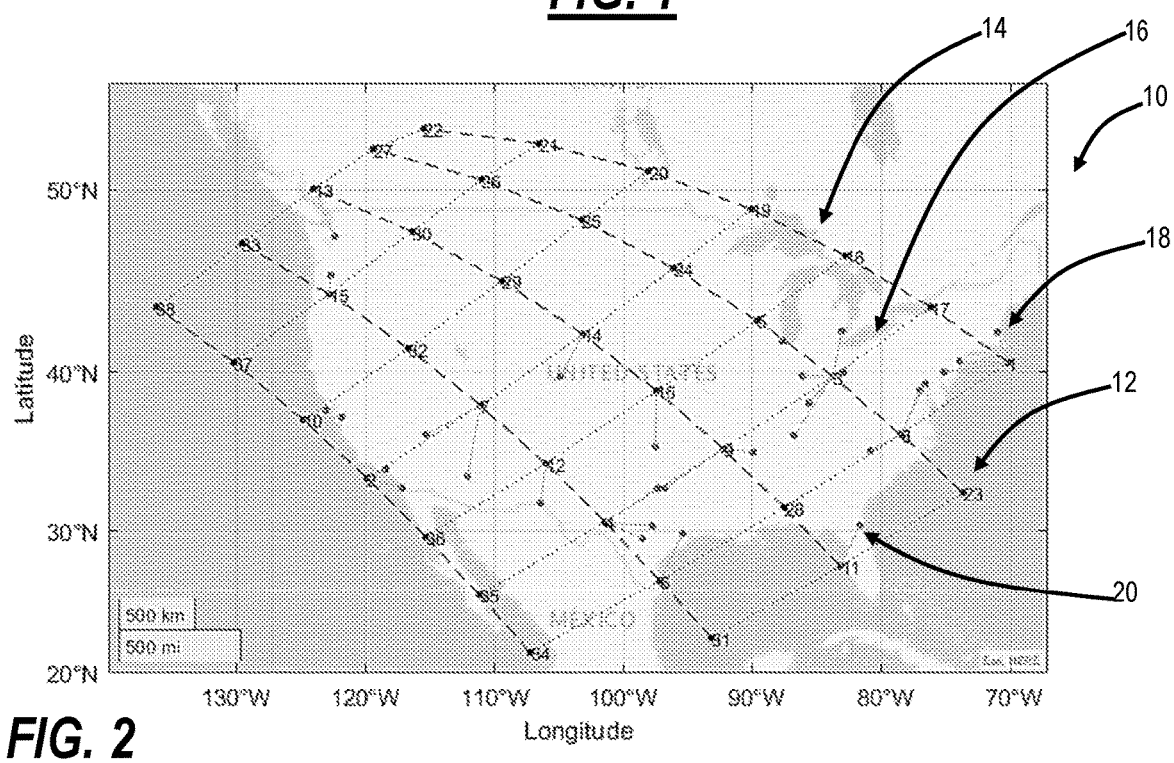
FIG. 2 is a map of the continental U.S. illustrating the LEO network of FIG. 1 including 30 most populous U.S. cities.

LEO MSS fly in formations including typically equally distanced satellites daisy-chained within separate orbital planes. FIG. 1 is a map of the earth illustrating an example LEO network 10 (the Starlink satellite network). FIG. 2 is a map of the continental U.S. illustrating the LEO network 10 including 30 most populous U.S. cities. For illustration purposes, the satellites in ascending orbits of Starlink satellite network are shown as an example LEO MSS to provide Internet Access. The present disclosure contemplates various other LEO MSS as well as MEG MSS and GEO MSS.

Figure 3:
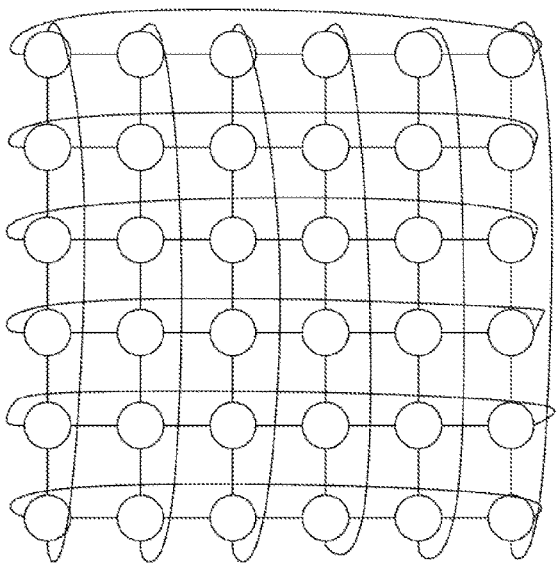
FIG. 3 is a network diagram of a Mesh-grid (2D Torus) topology with degree of 4 representative of a conventional LEO MSS.

Each satellite includes multiple optical modems to form ISC links, which in conventional legacy approaches are distinguished as intra-plane (i.e., within a single orbit) and inter-plane (i.e., cross-orbit). ISC links (i.e., ISL) are established between the satellites in closest proximity by means of four modems: two for intra-plane ISLs and two for inter-plane ISLs. Circular orbital intra-plane ISLs together with inter-plane ISLs form a network whose mesh-grid topology is very similar to a 2D Torus with degree of 4, as illustrated in FIG. 3.

The example Starlink constellation under analysis is comprised of 66 satellites per each of 24 53°-inclined orbital planes. A snapshot of a local satellite network comprised of group of satellites in ascending orbits over the continental US is frozen in time and shown in FIG. 2. In FIG. 2, satellites 12 are dots. Dashed lines are intra-plane ISLs 14 and also indicate orbital planes, while dotted line are inter-plane ISLs 16, together illustrating a relevant mesh-grid portion of the satellite network 10. Dots are 30 most populous cities 18 in the U.S. Lines 20 indicate which satellite 12 is connected to which city 18, but are not necessarily physical links, i.e., they could represent terrestrial traffic aggregation to a single ground station hub. Only 16 out of 38 satellites are connected to the ground stations hubs and they are numbered 1 through 16 in accordance with the total population of the cities within the corresponding ground hub—from higher to lower—for the purpose of further analysis.

Again, within the legacy mesh-grid topology based on closest proximity of satellites 12 the information is routed through the mesh-grid network of satellites 12 in not quite straight zigzag path and involves number of hops between the satellites 12 (8 hops between satellites over two most populous hubs, to be specific), utilizing as a result significant number of modems in the process, all of it resulting in increased latency and power consumption. It should also be noted that when packets traverse a modem, they consume network capacity, i.e., effective network load is a product of injected bit rate times number of hops a bit takes.

Figure 4:
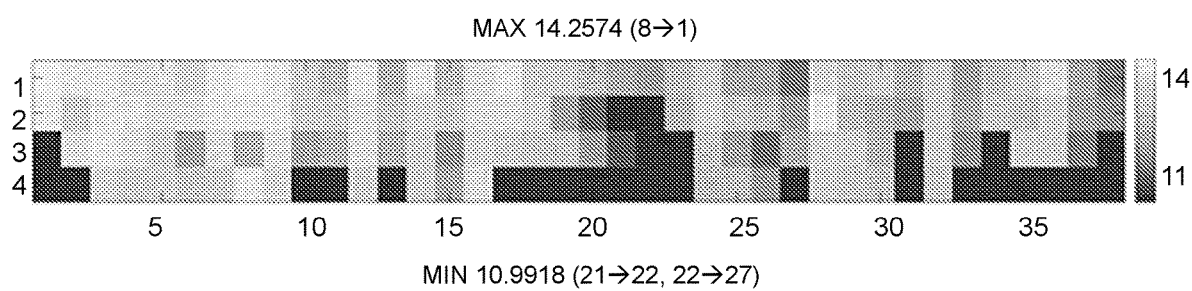
FIG. 4 is a shaded logarithmic ISL occupancy map in local mesh-grid topology satellite network; on the horizontal axis is hub/satellite number, and the vertical axis is transmitting modem number.

Drawbacks of the legacy ISL routing by proximity based on mesh-grid topology are excessive number of hops and zigzag shaped physical path between the source and destination, resulting in increased latency. Many more satellites and their corresponding modems are involved in relaying the traffic in the process, resulting in increased power consumption, both through modem count and by requiring modems to run in higher-power, higher-capacity modes. This is illustrated by simulated ISL occupancy, assuming the traffic between the hubs/satellites is proportional to the product of their corresponding connected city populations, shown in FIG. 4. Traffic is routed using Equal-Cost Multi-Path (ECMP) routing across equal hop count paths, if available. It is obviously seen that in legacy case, ISL occupancy spans the broad range of over three orders of magnitude, encompassing both ISLs with extremely high occupancy as well as plenty of ISLs with much lower occupancy.

Figure 5:
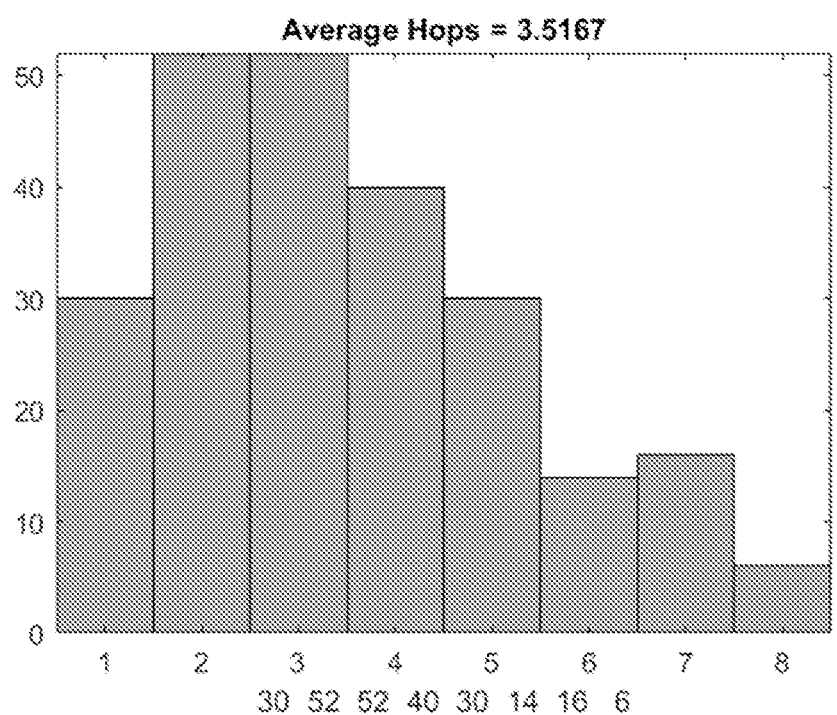
FIG. 5 is a histogram of the distribution of number of hops in the conventional LEO MSS, showing both average number of hops and numerical values of the distribution.
Figure 6:
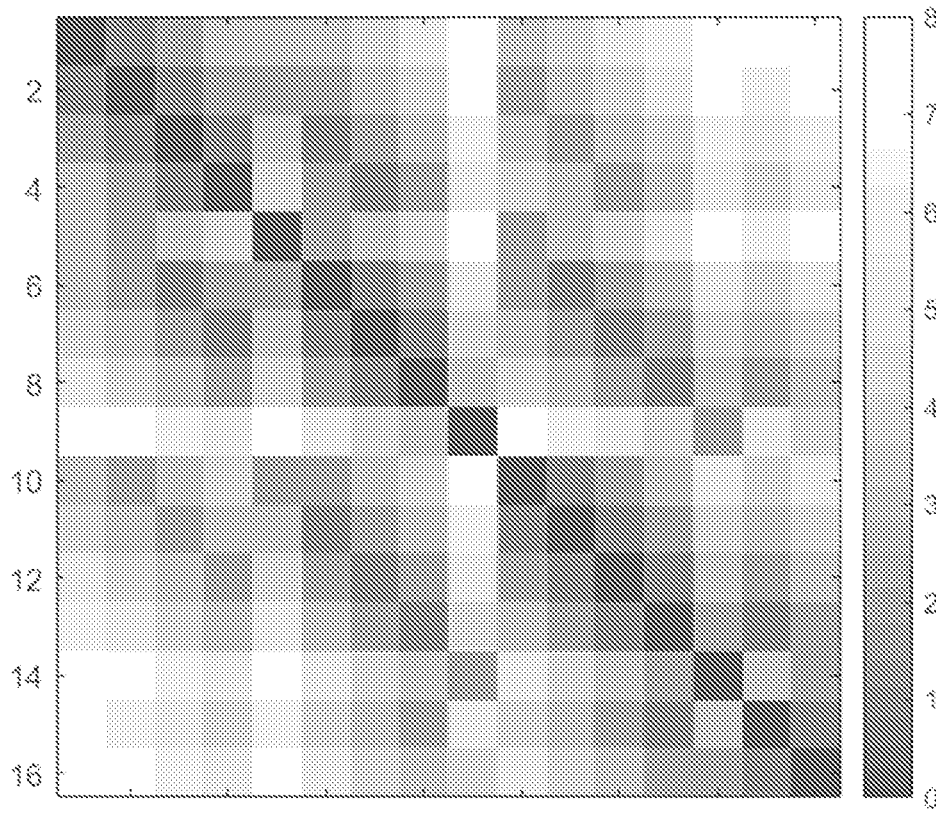
FIG. 6 is a shaded map of distances in hops for any pair of hubs/satellites in the conventional LEO MSS of FIG. 2.

The latency in the case of legacy routing by proximity is affected by number of hops from source hub/satellite to destination hub/satellite. A histogram of the distribution of number of hops is in FIG. 5, showing both average number of hops and numerical values of the distribution. FIG. 6 is a shaded map of distances in hops for any pair of hubs/satellites. The maximum distance is 8 hops.

There are two cumulative parameters used for comparative analysis of legacy mesh-grid topology with the new innovative Express-Mesh topology presented herein:
1) Network load, defined as a sum for all pairs of hubs/satellites of traffic (as product of the populations) times number of hops between them (normalized). Network Load~4.8 for the legacy routing by proximity in the mesh-grid topology.
2) Network latency, defined as a sum of traffic times the physical distance in kilometers (normalized). Network latency~7.7.

Topological Innovations

The present disclosure includes an innovative Express-Mesh topology based on direct ISL interconnections between the satellites over ground station hubs (16 of them in an example case) within their mutual range. Direct ISLs are prioritized between the most populous hubs to reduce the number of hops between source and destination and provide the shortest physical link length for reduced latency. Another benefit of this new Express-Mesh topological innovation is in drastically reduced number of satellites and their modems actively involved in the relaying the information. The idle modems can be powered down temporarily completely to reduce the power consumption or can be put into a low-power low-capacity mode to support other traffic not accounted for in this simplified analysis. The satellites would need to maintain at least some low-bandwidth connection to the rest of the network, likely using two modems for redundancy in a low-bandwidth mode, for command and control plane functions, for rapid failover in case of other satellite failures, and for carrying low-bandwidth traffic from sparsely distributed data sources like ocean vessels, etc.

Figure 7:
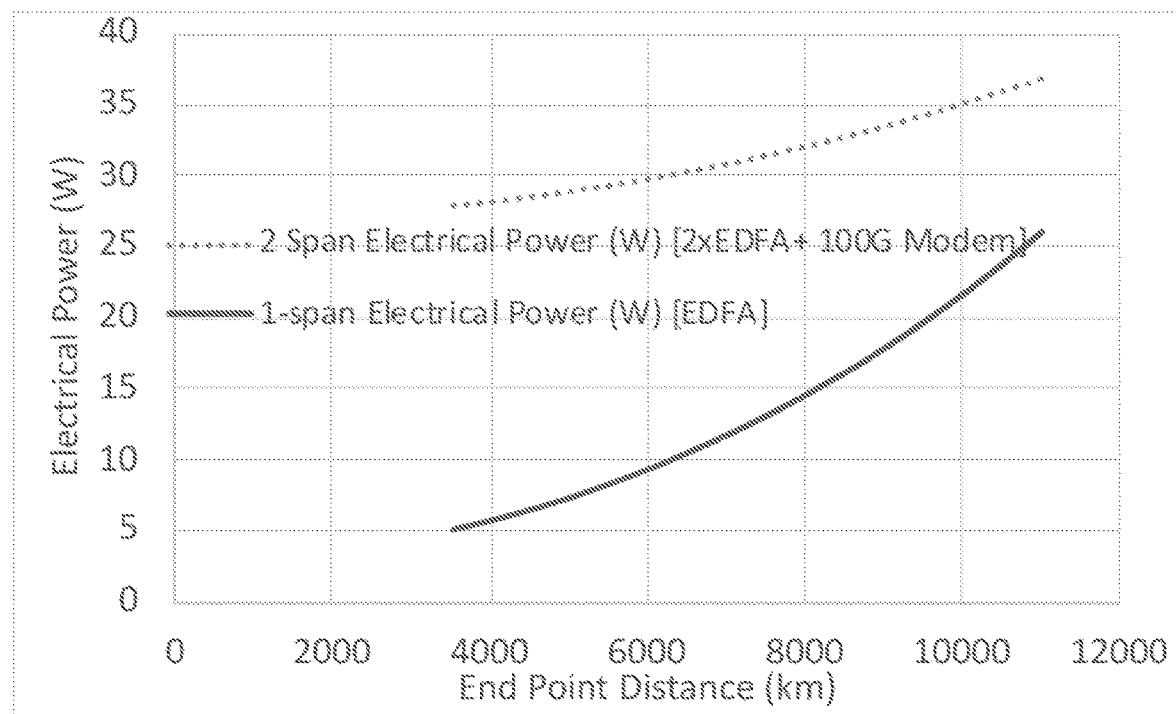
FIG. 7 is a graph of total incremental ISL power consumption with either 1 or 2 hops covering end-point separation.

Of note, unlike terrestrial links, satellite links gain in efficiency if intermediate satellites can be avoided. An optical link with 2× direct interconnect distance is much more efficient than 2× optical links going through an intermediate satellite, as shown in FIG. 7, assuming 100 Gb/s modem performance.

Unlike the legacy network, the Express-Mesh network topology attempts to reduce satellite utilization and latency by providing more direct connections among nodes (satellites) 12. For example, the 30 source/destination cities 18 from FIG. 2 are aggregated into 16 satellites 12 based on overhead proximity. Of course, since each satellite 12 has only four links formed by four coherent optical modems, a full mesh of only five hubs/satellites is possible, but among 16 satellites, a full mesh cannot be established. Therefore, some demands still take additional hops through the network.

Figure 8:
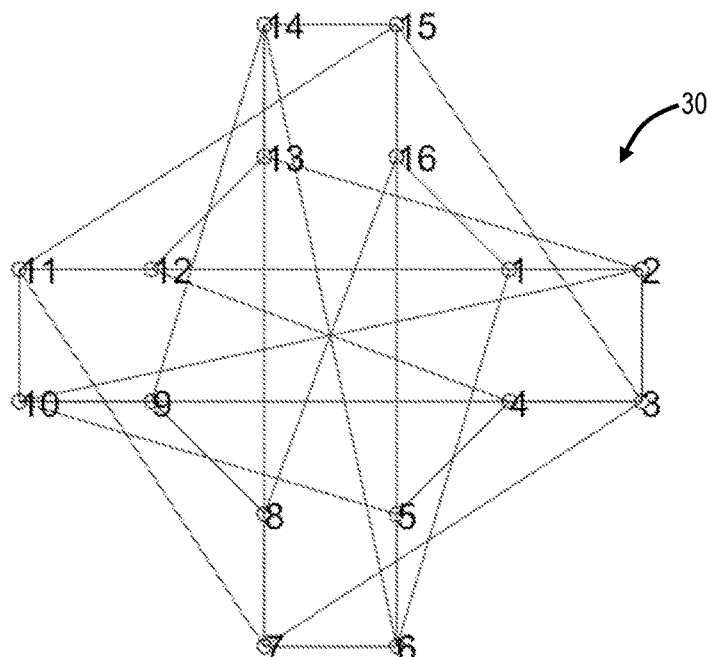
FIG. 8 is a network diagram of an Express-Mesh network topology for the 30 most populous source/destination cities from FIG. 2.
Figure 9:
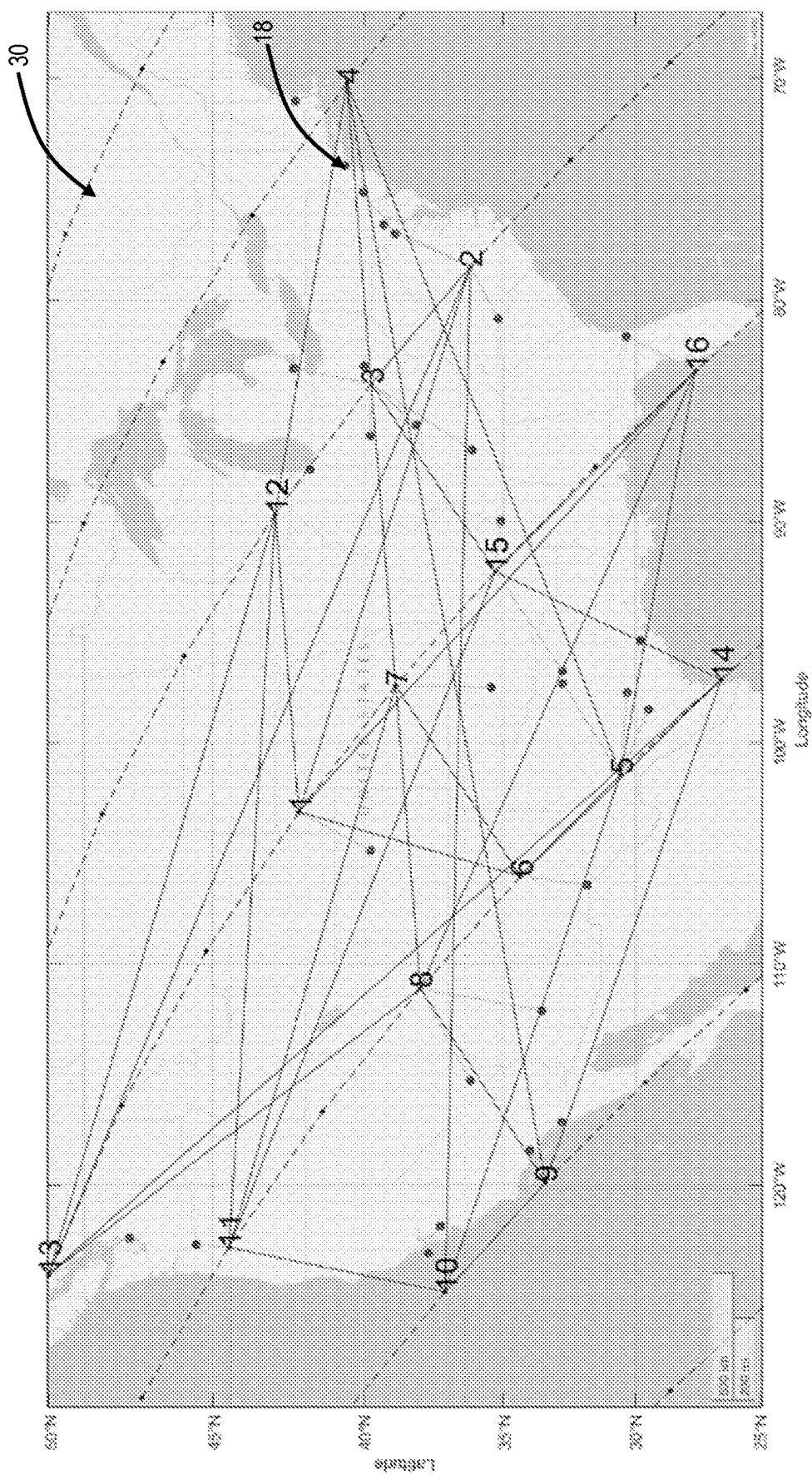
FIG. 9 is a map of the continental U.S. with the same satellites from the LEO network of FIG. 1 with an optimal 16 four-degree node Express-Mesh topology connecting 16 hubs/satellites into diameter 3 local satellite network.

FIG. 8 is a network diagram of an Express-Mesh network topology 30 for the 30 source/destination cities 18 from FIG. 9. The optimal Express-Mesh network topology 30 of 16 four-degree nodes having as low as 3 hops maximum (which is also called diameter) is in FIG. 8. This Express-Mesh network topology 30 ensures the closest possible connections between the most populated hub/satellites, while maintaining the maximum number of hops not exceeding three. There are actually only two pairs of hubs/satellites at the distance of three hops, i.e., nodes 1 and 9 and nodes 5 and 13, resulting in majority of connections including one or two hops with 1.75 hops on average.

This new optimal Express-Mesh topology is overlaid on the same snapshot of Starlink satellites as FIG. 2, albeit with #1 through #16 being connected, as is illustrated in FIG. 9. Satellites are numbered in this case in accordance with the nodes of the optimal network illustrated in FIG. 8.

Figure 10:
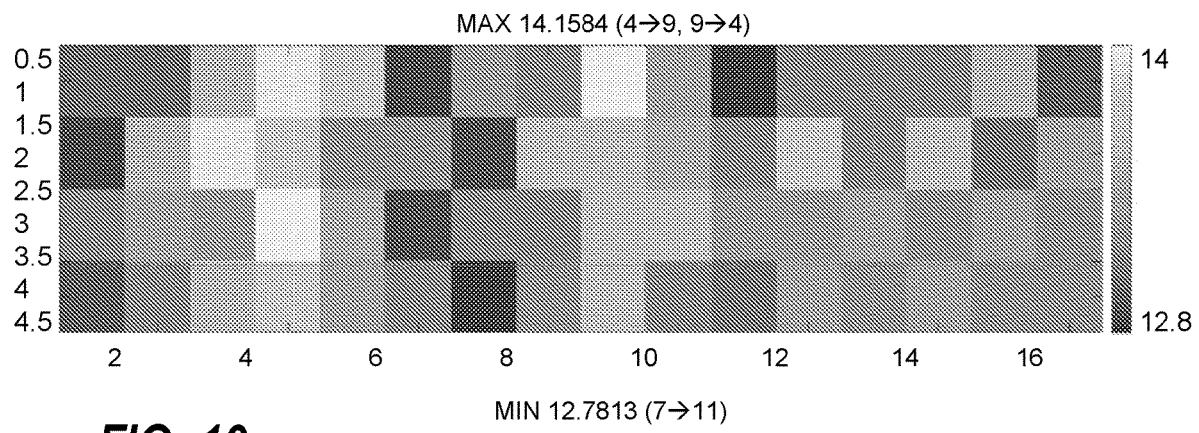
FIG. 10 is a shaded logarithmic ISL occupancy graph in local Express-Mesh topology satellite network of FIG. 9; on horizontal axis is hub/satellite number, and the vertical axis is transmitting modem number.

The simulated ISL occupancy for new optimal Express-Mesh topology, similarly assuming the traffic between the hubs/satellites is proportional to the product of their corresponding populations, is shown in FIG. 10. Again, traffic is routed using ECMP across equal hop count paths, if available. This is for comparison with FIG. 4. It is obviously seen that in case of Express-Mesh topology ISL occupancy spans much narrower range of just little bit over an order of magnitude, with all ISLs having much more uniform occupancy, maximum of it being smaller than that for legacy routing by proximity.

Figure 11:
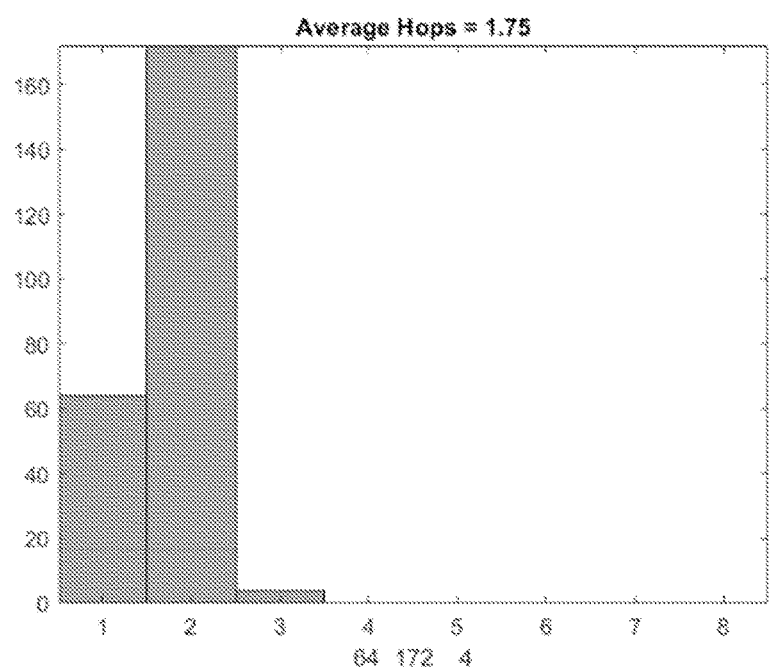
FIG. 11 is a histogram of the distribution of number of hops in the Express-Mesh topology satellite network of FIG. 9, showing both average number of hops and numerical values of the distribution.
Figure 12:
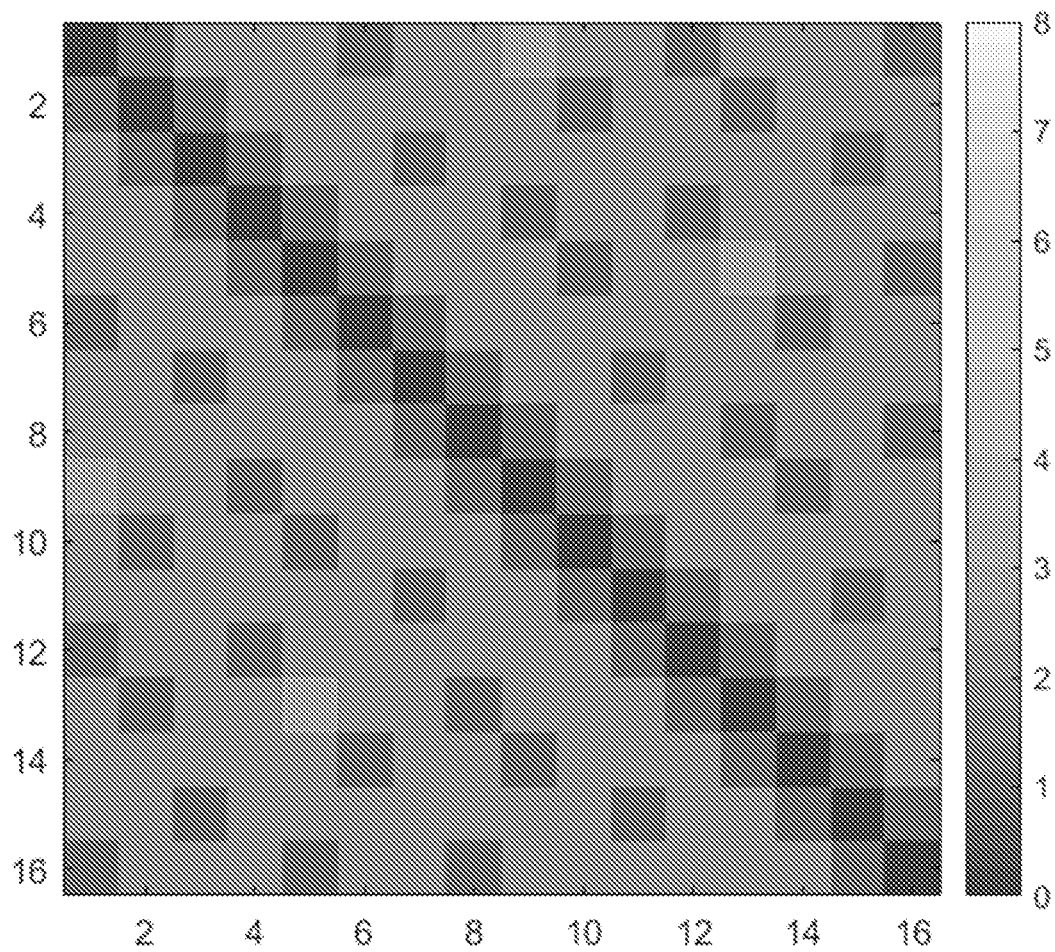
FIG. 12 is a shaded map of distances in hops for any pair of hubs/satellites in the Express-Mesh topology satellite network of FIG. 9.

Also, latency in the Express-Mesh is reduced due to smaller number of hops from source hub/satellite to destination hub/satellite. A histogram of the distribution of number of hops is shown in FIG. 11, showing both average number of hops and numerical values of the distribution. FIG. 12 is a shaded map of distances in hops for any pair of hubs/satellites. Maximum distance is just 3 hops. FIG. 12 uses the same shading scale as FIG. 6 for easier comparison.

The two cumulative parameters for new innovative Express-Mesh topology are:
1) Network load, defined as a sum for all pairs of hubs/satellites of traffic (as product of the populations) times number of hops between them (normalized). Network Load is ~2.1.
2) Network latency, defined as a sum of traffic times the physical distance in kilometers (normalized). Network latency is ~3.9.

These statistic metrics for both Mesh-Grid (2D torus) and Express-Mesh topologies are comparatively presented in the Table 1.

TABLE 1

Comparative metrics for Mesh-Grid and Express-Mesh local satellite networks over continental US.

| | Average hops | Maximum hops | Network Load | Average Network Latency | Number of Modems |
|---|---|---|---|---|---|
| Mesh-Grid | 3.5167 | 8 | ~4.8 | ~7.7 | 126 |
| Express-Mesh | 1.75 | 3 | ~2.1 | ~3.9 | 64 |
| Ratio | 2:1 | 2.7:1 | 2.3:1 | 2:1 | 2:1 |

Example Global Satellite Network

FIG. 1 illustrates the global example Starlink constellation under analysis and includes 66 satellites per each of 24 53°-inclined orbital planes having 1584 satellites total. Satellites in ascending/descending parts of the orbit are marked as different shaded dots. Contrasted dashed shaded lines are intra-plane ISLs and also indicate south/north bound parts of orbital planes, while dotted line are inter-plane ISLs, together illustrating the global mesh-grid satellite network of 1584 satellites. Lines indicate which satellite is connected to which city, but are not necessarily physical links, i.e., they could represent terrestrial traffic aggregation to a single ground station hub. Only 199 out of 1584 satellites are connected to the ground hubs. Satellites are numbered cumulatively in 66 consecutive numbers per each of 24 orbits (numbers are not shown in FIG. 1 to avoid clutter).

Figure 13:
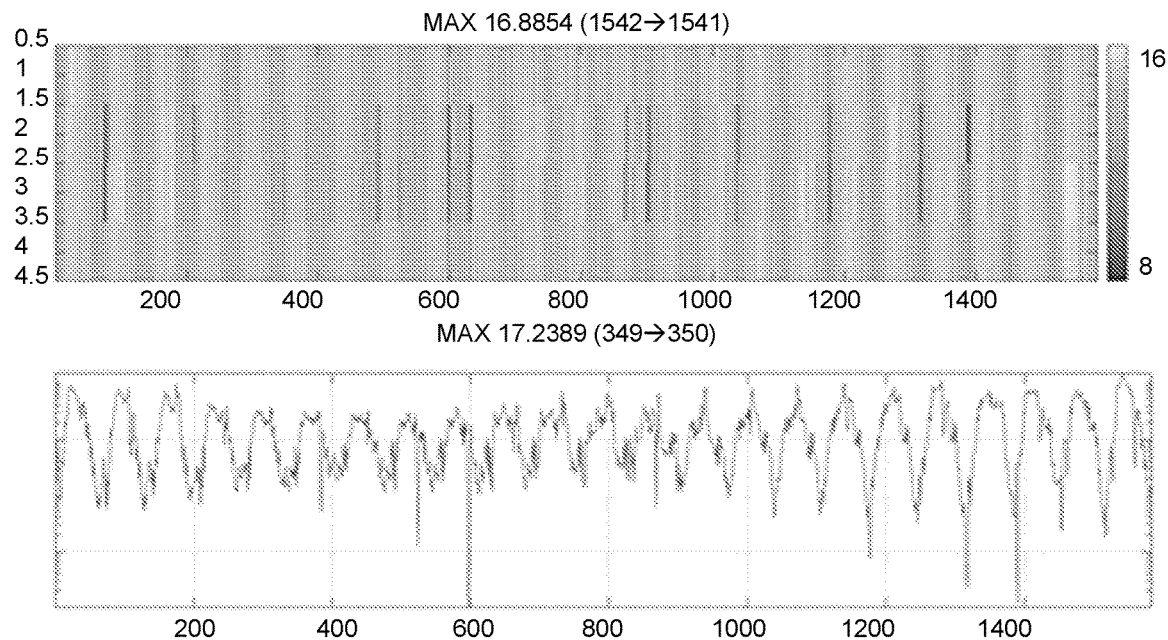
FIG. 13 is a shaded logarithmic ISL occupancy map in a conventional global satellite network of FIG. 1; on horizontal axis is hub/satellite number, and the vertical axis is transmitting modem number.

Similarly to the above mentioned case of a continental U.S. satellite network, ISL occupancy of global satellite network was simulated as well, assuming the traffic between the hubs/satellites is proportional to the product of their corresponding connected city populations, shown in FIG. 13. Traffic is routed using ECMP across equal hop count paths, if available.

Prominent periodic oscillation of both the ISL occupancy and total amount of traffic per satellite are the results of satellites cycling in and out of heavily populated areas in the course of their orbits. This results in up to ten orders of magnitude variation of ISL occupancy with all but 40 out of 6336 of their total number being actively involved in the transmission of data traffic.

Figure 14:
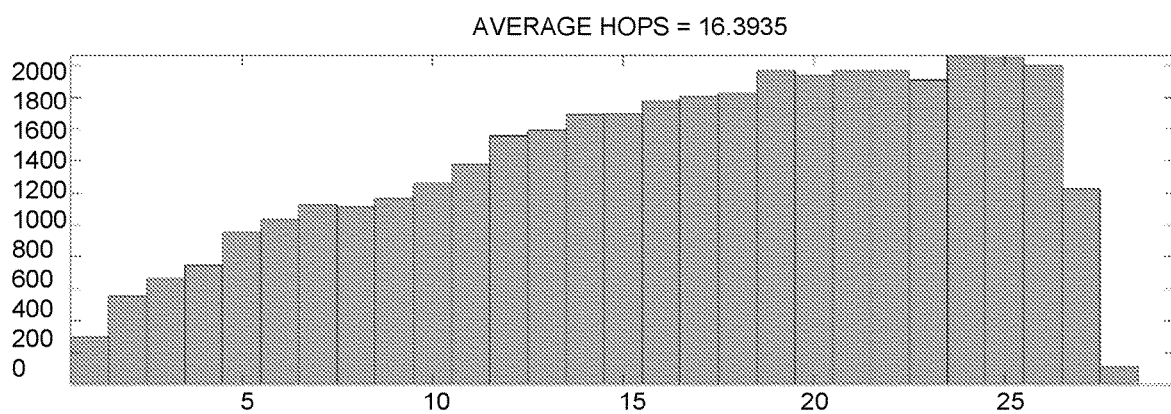
FIG. 14 is a histogram of the distribution of number of hops in the conventional global satellite network of FIG. 1, showing both average number of hops and numerical values of the distribution.

Latency in case of legacy routing by proximity is affected by number of hops from source hub/satellite to destination hub/satellite. Histogram of the distribution of number of hops is in FIG. 14, showing both average number of hops (more than 16) and numerical values of the distribution ranging up to 29 hops.

Proposed Express-Mesh Topology

Figure 15:
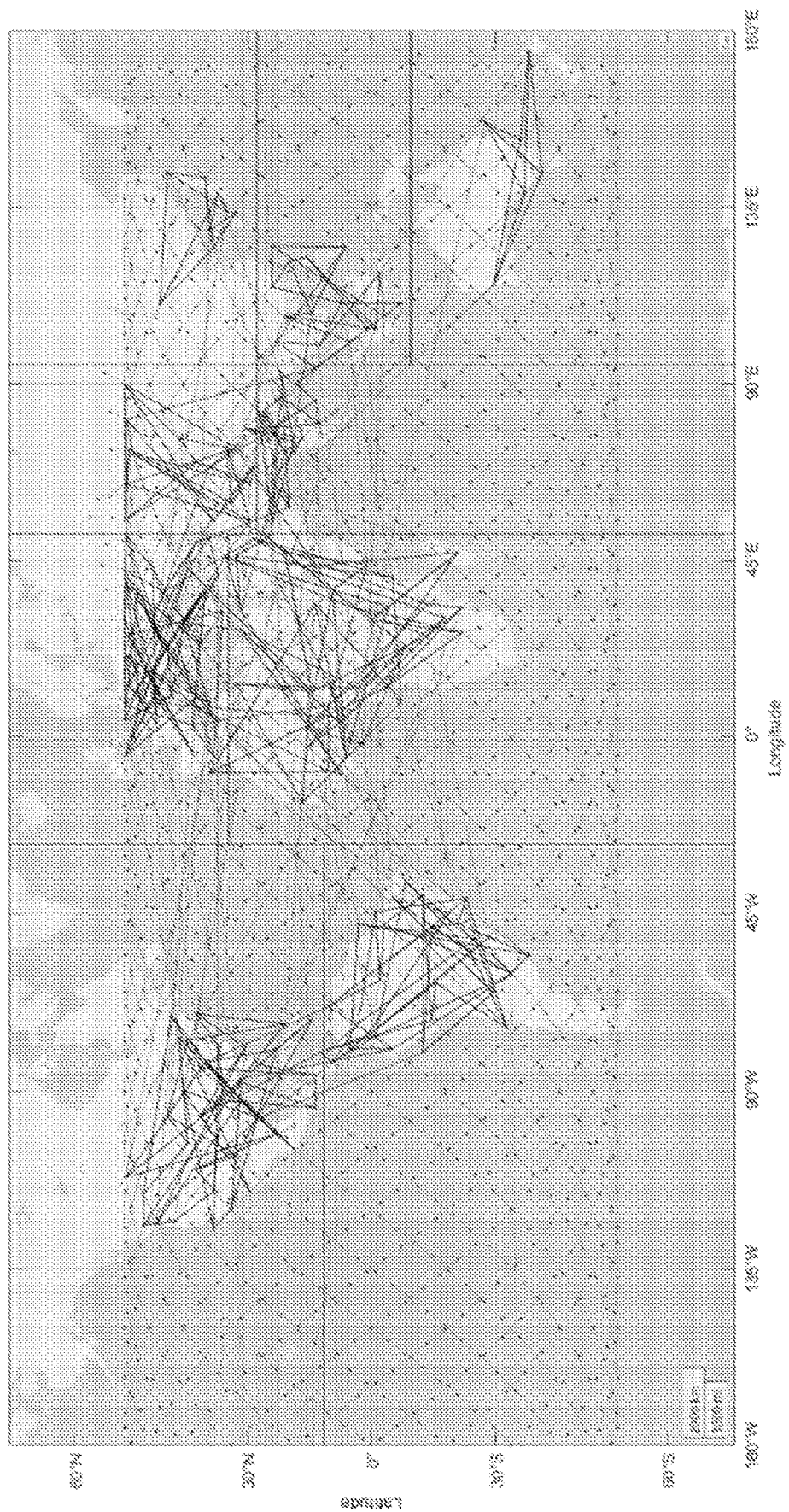
FIG. 15 is a map of the Earth with a global Express-Mesh satellite network over 400 cities with more than 1 million population.

Express-Mesh topology network for global satellite network was designed as compound graph of 9 clusters of different size. The nine separate regional clusters are designated for coverage of Europe, Africa, North America, South America, South-Eastern Asia, Central Asia, India, Far East, and Australia with New Zealand. The clusters are all degree 3 graphs with correspondingly 38, 38, 36, 30, 18, 16, 14, 8, and 6 nodes. This means that 3 out of 4 modems are designated for intra-cluster communication links. The first four clusters have diameter 4, next three clusters have diameter 3 and last two clusters have diameter 2. This amounts to total of 204 hubs/satellites comprising the Express-Mesh topology with fourth modem designated for inter-cluster communication links, as it is pictured in FIG. 15.

Figure 16:
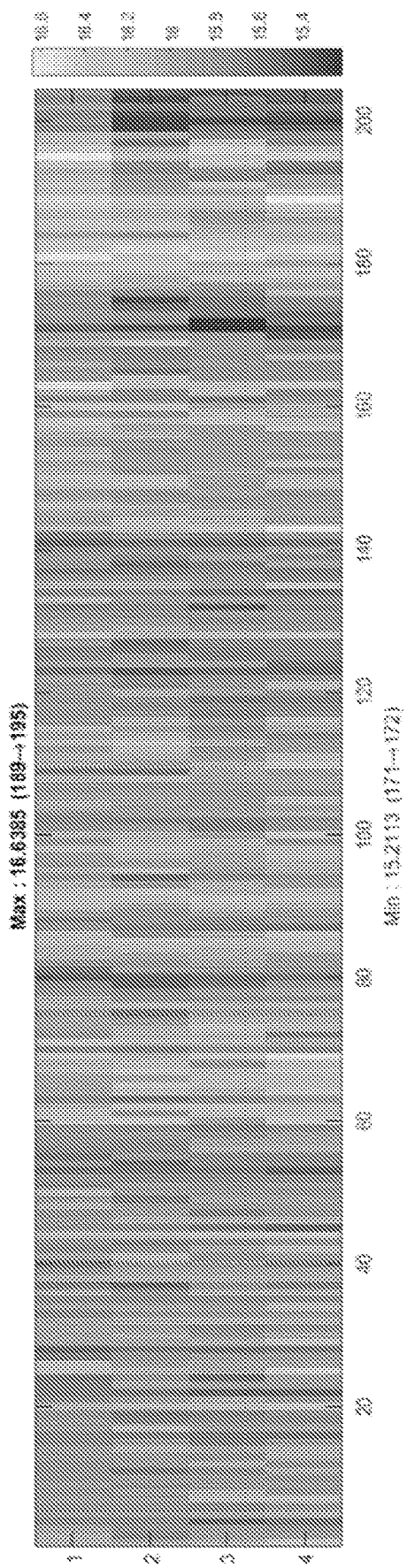
FIG. 16 is a shaded logarithmic ISL occupancy map in the global Express-Mesh satellite network of FIG. 15; on horizontal axis is hub/satellite number, and the vertical axis is transmitting modem number.
Figure 17:
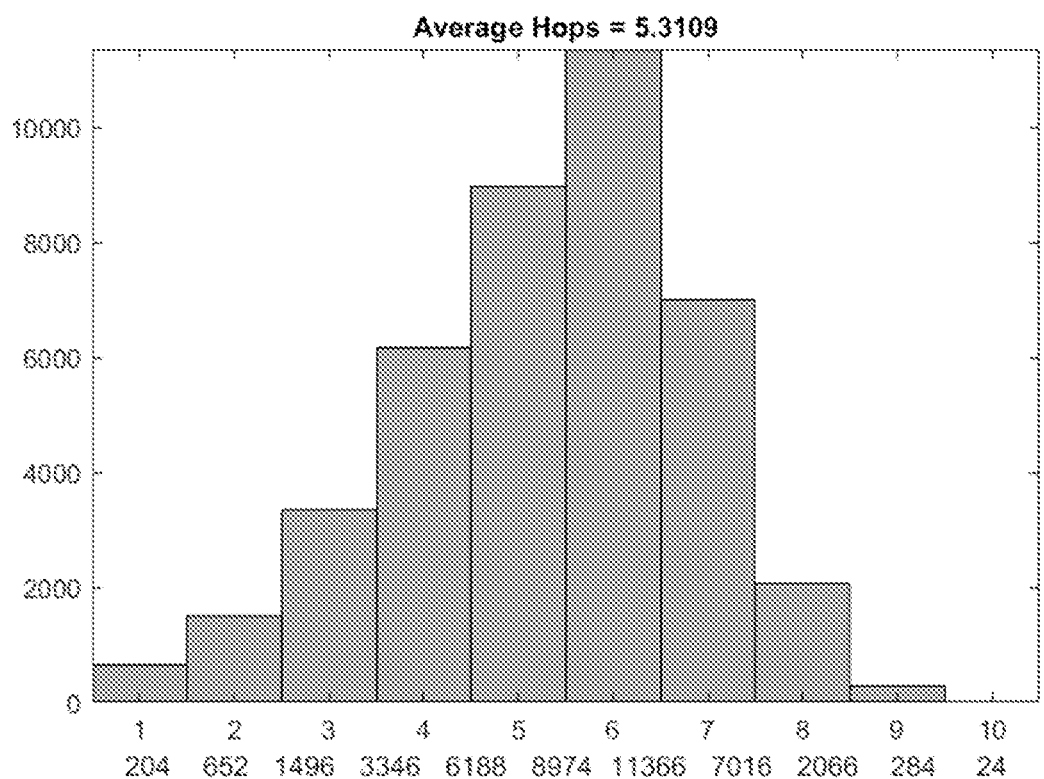
FIG. 17 is a histogram of the distribution of number of hops in the global Express-Mesh satellite network of FIG. 15, showing both average number of hops and numerical values of the distribution.

Simulated ISL occupancy for global Express-Mesh topology satellite network is shown in FIG. 16. ISL occupancy in case of Express-Mesh topology, unlike mesh-grid, spans only one order of magnitude and its maximum value is below that for mesh-grid as well. Average number of hops, including extra hops to bridge the inter-cluster connections, is only 5.3109 and maximum hops is 10, as shown in histogram of the distribution of number of hops is in FIG. 17, showing both average number of hops and numerical values of the distribution.

Finally, statistic metrics for both Mesh-Grid (2D torus) and Express-Mesh topologies are comparatively presented in the Table 2. Note much better performance and power metrics for Express-Mesh topology.

TABLE 2

Comparative metrics for Mesh-Grid and Express-Mesh global satellite networks.

|  | Average hops | Maximum hops | Network Load | Average Network Latency | Number of Active Modems |
|---|---|---|---|---|---|
| Mesh-Grid | 16.3935 | 29 | ~30.4 | ~95 | 6296 |
| Express-Mesh | 5.3109 | 10 | ~9.85 | ~52 | 1092 |
| Ratio | 3:1 | 2.9:1 | 3.08:1 | 1.83:1 | 5.8:1 |

Process for Configuring an Express Mesh Satellite Network

Figure 18:
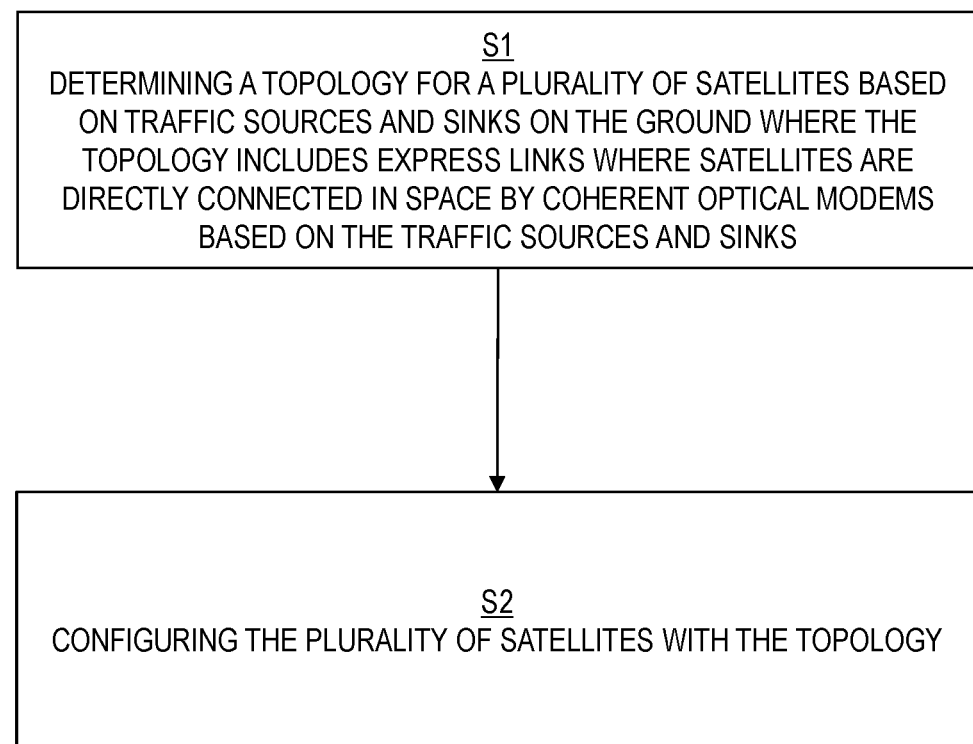
FIG. 18 is a flowchart of a process for configuring an express mesh satellite network.

FIG. 18 is a flowchart of a process for configuring an express mesh satellite network. The process contemplates implementation as a method with steps, via a processing device having one or more processors to implement the steps, and as instructions embodied in a non-transitory computer-readable medium. The process can be implemented in a management platform that communicates to the satellites 12.

The steps include determining a topology for a plurality of satellites based on traffic sources and sinks on the ground where the topology includes express links where satellites are directly connected in space by coherent optical modems based on the traffic sources and sinks (step S1); and configuring the plurality of satellites with the topology (step S2).

The topology includes no more than three hops to reach any satellite over a geographic area. The plurality of satellites are configured to become a node in the topology when in an associated affinity area having a ground link or requiring a relay function. The plurality of satellites can be in LEO, MEO, etc. The plurality of satellites are configured to power down or switch to low-bandwidth mode corresponding coherent optical modems outside of the associated affinity area, unless they are required to provide relay connections.

The topology is fixed while the plurality of satellites orbit and take roles in the topology based on their location. This fixed topology can be based on normal operation. Of course, there could be effects such as cloud cover that could perturb the topology, requiring some amount of recomputation or possibly pre-stored state. For example, the Washington DC area could have substantial cloud cover precluding high bandwidth optical ground to satellite links, so traffic would be transported to nearest clear-sky ground station like Philadelphia or New York city.

A coherent optical modem can be configured with a modulation format to accommodate required direct connection distance to another satellite with required bandwidth. Also, transmitted optical power of a coherent optical modem can be configured to accommodate required direct connection distance to another satellite with required bandwidth. Of course, both modulation format and transmitted optical power can be configured together.

In another embodiment, an express mesh satellite network includes a plurality of satellites arranged in a constellation, each including at least four coherent optical modems, wherein the plurality of satellites are configured in a topology based on traffic sources and sinks on the ground where the topology includes express links where satellites are directly connected in space by the coherent optical modems based on the traffic sources and sinks.

Also, in another embodiment, it can be possible to direct multiple modems through a single aperture telescope, essentially implementing Wavelength Division Multiplexing (WDM) in space. For example, an extra modem could come from ones that are shut down in another direction, or adding another extra modem per satellite that can be used to relieve link hot spots by being allocated as needed to a particular direction, i.e., implementing 2×WDM in a particular direction.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause one or more processors to perform steps of:
monitoring a plurality of satellites in a constellation, wherein each of the plurality of satellites includes a plurality of coherent optical modems;
determining a topology of the constellation based on (1) ground traffic sources and sinks and (2) locations of any of the plurality of satellites, wherein the topology includes express links connecting satellites by coherent optical modems configured to dynamically select wavelengths for each express link based on line-of-sight connectivity and traffic demands, the selected wavelengths being assigned between satellites based on the traffic demands; and
causing the any of the plurality of satellites and their corresponding plurality of coherent optical modems to perform one or more of a relay function and a ground link, with corresponding coherent optical modems of the plurality of coherent optical, and based on the topology.

2. The non-transitory computer-readable medium of claim 1, wherein the steps further include
causing some or all of the plurality of coherent optical modems in a corresponding satellite of the plurality of satellites to power down or reduce power based on the topology.

3. The non-transitory computer-readable medium of claim 1, wherein the steps further include
causing configuration of the plurality of coherent optical modems in the any of the plurality of satellites based on the topology.

4. The non-transitory computer-readable medium of claim 3, wherein the configuration includes a modulation format to accommodate required direct connection distance to another satellite with required bandwidth.

5. The non-transitory computer-readable medium of claim 1, wherein the topology includes a limit to a number of hops to reach any satellite over a geographic area.

6. The non-transitory computer-readable medium of claim 1, wherein the plurality of satellites are configured to move in the topology.

7. The non-transitory computer-readable medium of claim 6, wherein the topology includes one or more express links whereby adjacent satellites are skipped.

8. The non-transitory computer-readable medium of claim 6, wherein a given satellite is configured to change in the topology based on corresponding movement.

9. The non-transitory computer-readable medium of claim 1, wherein the plurality of satellites are fixed in the topology when in an affinity area.

10. The non-transitory computer-readable medium of claim 1, wherein the topology includes a mesh.

11. A method of configuring an express mesh satellite network comprising step of:
monitoring a plurality of satellites in a constellation, wherein each of the plurality of satellites includes a plurality of coherent optical modems;
determining a topology of the constellation based on (1) ground traffic sources and sinks and (2) locations of any of the plurality of satellites, wherein the topology includes express links connecting satellites by coherent optical modems configured to dynamically select wavelengths for each express link based on line-of-sight connectivity and traffic demands, the selected wavelengths being assigned between satellites based on the traffic demands; and
causing the any of the plurality of satellites and their corresponding plurality of coherent optical modems to perform one or more of a relay function and a ground link, with corresponding coherent optical modems of the plurality of coherent optical, and based on the topology.

12. The method of claim 11, wherein the steps further include
causing some or all of the plurality of coherent optical modems in a corresponding satellite of the plurality of satellites to power down or reduce power based on the topology.

13. The method of claim 11, wherein the steps further include
causing configuration of the plurality of coherent optical modems in the any of the plurality of satellites based on the topology.

14. The method of claim 13, wherein the configuration includes a modulation format to accommodate required direct connection distance to another satellite with required bandwidth.

15. The method of claim 11, wherein the topology includes a limit to a number of hops to reach any satellite over a geographic area.

16. The method of claim 11, wherein the plurality of satellites are configured to move in the topology.

17. The method of claim 16, wherein the topology includes one or more express links whereby adjacent satellites are skipped.

18. The method of claim 16, wherein a given satellite is configured to change in the topology based on corresponding movement.

19. The method of claim 11, wherein the plurality of satellites are fixed in the topology when in an affinity area.

20. The method of claim 11, wherein the topology includes a mesh.

* * * * *